July 22, 1969
J. GREENSPAN
3,457,085
PROCESS FOR PREPARING MEAT LOAF
Filed Jan. 28, 1965
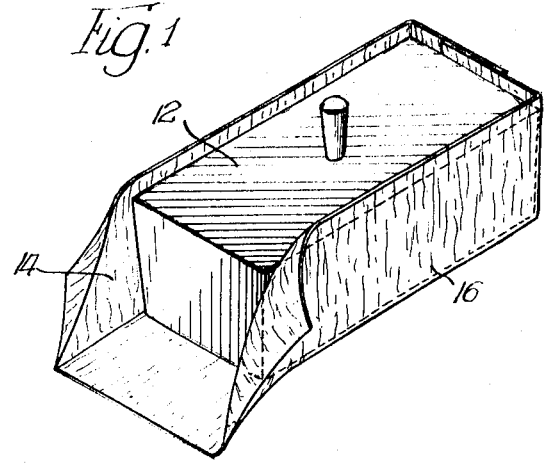
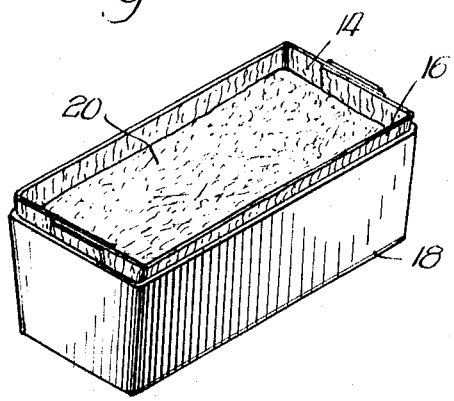
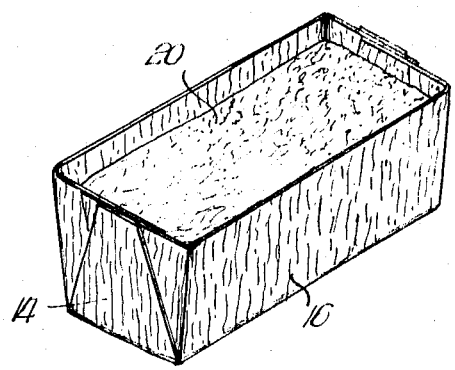
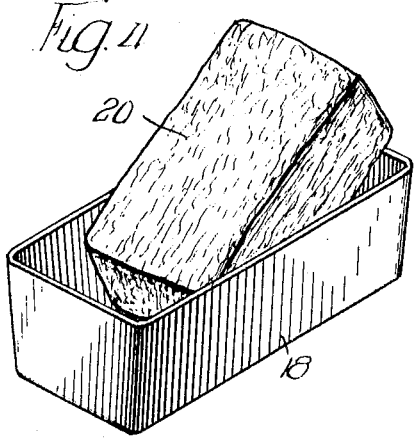
INVENTOR.
Joseph Greenspan,
BY

# United States Patent Office 3,457,085
Patented July 22, 1969

3,457,085
PROCESS FOR PREPARING MEAT LOAF
Joseph Greenspan, Evergreen Park, Ill., assignor to Frigidmeats, Inc., Chicago, Ill., a corporation of Illinois
Filed Jan. 28, 1965, Ser. No. 428,806
Int. Cl. A22c; B65b 29/10
U.S. Cl. 99—108                           1 Claim

ABSTRACT OF THE DISCLOSURE

A commercial process for preparing cooked meat loaf in which uncooked meat loaf material having a predetermined cooking shrinkage is prepared, and a cooking container therefor prepared by wrapping thin aluminum foil over a form to define a foil cooking container having dimensions greater than the specified dimensions of the cooked meat loaf by an amount compensating for cooking shrinkage. The foil container is packed with meat loaf in a rigid supporting packing mold which maintains the configuration of the container. The meat loaf material and the enveloping and adhering foil container form in combination a self-supporting dimensionally stable unit which may be cooked without any additional supporting container. The thin foil is drawn inwardly with the surfaces of any meat loaf material to which it adheres during the shrinkage of the meat loaf material in cooking and thereby prevents tearing of the meat loaf surfaces. The metal foil is disposably stripped from the meat loaf after it has been cooked.

---

The present invention relates to methods for the commercial preparation of edible meat loaf and in particular to means and methods for efficiently manufacturing on a mass production basis consumer acceptable meat loaves, having controlled weight and dimensions.

Meat loaf is a food presenting a particular preparation problem for commercial food distributors such as restaurants and cafeterias. It has been found that the only publicly saleable form of meat loaf has a conventional rectangular molded shape and a baked appearance, including "crusty" appearing outer surfaces. This appearance requirement necessitates that each loaf be individually baked, rather than cut from a larger unit after baking. Special problems are presented which make it very difficult to satisfactorily produce individual meat loaves on a quantity basis.

One of the major problems that is faced is that of extensive shrinkage, which every meat loaf undergoes during the baking process. This shrinkage occurs both in the weight and in the dimensions of the uncooked loaf. For commercial use it is required that meat loaves should conform to particular dimensions to adapt themselves to placement on serving steam tables, which normally include pans of a specific size and configuration into which the meat loaf must fit. Additionally, each meat loaf is expected to be of a fixed weight so the proper cost and portion control can be exercised. The above requirements of specific size and weight for the finished product necessitate a compensatory adjustment of the dimensions and weight for the initial uncooked meat loaf so as to arrive at the proper finished product after both weight and dimensional shrinkage. This additive compensation in size and weight must be properly and uniformly scheduled for all of the loaves.

A further and related problem is that conventional meat loaf has a definite tendency to stick to the surfaces of its cooking pan during the cooking operation. This results in loss of meat loaf material from the finished meat loaf and deleteriously affects the appearance of the loaf.

It is a general object of the present invention to provide means and methods for meeting the above described and other problems.

An object of the invention is to provide methods for preparing edible meat loaves on a commercial mass production basis with controlled weight and dimensions.

A further object of the invention is to provide processes for cooking meat loaf which accurately provide for shrinkage of the meat loaf during cooking.

A further object of the invention is to provide a cooking container for meat loaf which is inexpensive, readily removable and disposable, yet which maintains a desired rectangular configuration for said meat loaf.

A specific object of the invention is to provide processes for cooking meat loaf in which flexible material is folded over a form to make a lightweight rectangular cooking container sufficiently larger than the configuration of the finished meat loaf to provide for shrinkage, and in which said cooking container is packed with meat loaf material while supported by a mold, and then said meat loaf material is baked in said cooking container.

Further objects and features of the invention pertain to the particular arrangement and details of the methods and means whereby the above identified objects and other objects of the invention are attained.

The invention both as to its methods and the means employed therein will be better understood by reference to the following specifications and drawings forming a part thereof wherein:

FIGURE 1 is a perspective view of an exemplary rectangular form used in a process according to the invention, showing this form partially wrapped with thin metal foil;

FIGURE 2 shows a perspective view of an exemplary thin metal foil cooking container made upon the form of FIGURE 1 positioned within a packing mold and having meat loaf material packed therein;

FIGURE 3 is a perspective view of the cooking container of FIGURE 2 removed from the packing mold; and FIGURE 4 shows a cooked and frozen meat loaf prepared according to the invention about to be placed in a steam table container.

Turning now to the drawings, there are shown therein exemplary means which may be utilized in carrying out an exemplary commercial meat loaf preparation process in accordance with the present invention. Specifically, the exemplary process of the invention employs a mold or form 12 about which is wrapped a sheet of thin metal foil 14 to provide a foil cooking container 16 having rectangular dimensions designed for precompensation for the substantial shrinkage of the meat loaf during cooking. A packing mold 18 is adapted to support dimensionally the foil cooking container 16 during an operation in which the meat loaf material is packed into the container 16, after which the measured meat loaf 20 and its foil container 16 are dimensionally stable and may be directly entered into a cooking operation. The foil container 16 provides an improved cooking environment and other advantages as will be explained herein. The foil 14 is stripped from the meat loaf 20 after the cooking operation, leaving a finished meat loaf of improved appearance and accurately controlled dimensions and weight, highly suitable for direct use in commercial establishments.

A preferred size of cooked meat loaf for commercial users is a meat loaf in the three pound range having the maximum dimensions 8¼" long by 4⅛" wide, measured at the top, thereby fitting within the size steam table pans from which they are conventionally served. The generally demanded maximum error in weight is one ounce, or approximately 2%. This is a very difficult standard to maintain because of the considerably shrinkage and inconsistant nature of the shrinkage in meat loaf during cooking. For example where the initial fat content is about 19%, shrinkage is 13 ounces for 63 ounces of raw meat loaf mix or approximately 20%. Additionally, there is a dimensional shrinkage, that for the 8⅛″ length above for example being approximately 1″ from the uncooked loaf length.

The cooking container utilized in the process has its general configuration determined by the requirements of the shape of the particular steam table pans into which the meat loaf must be fitted. This dictates that the meat loaf material must be formed not in a rounded loaf configuration, as is conventionally done in home cooking, but in a substantially rectangular loaf configuration, which requires the loaf material be supported in its soft uncooked state by the cooking container. It is also desired to avoid the usual problem of meat loaf sticking to the supporting sides of the cooking container so as to eliminate the difficult cleaning presently required.

The above features are provided by employing for the cooking container 16 a metal foil or other suitable flexible yet waterproof and heatproof material that has sufficient strength to provide some support to the uncooked meat loaf, so that the meat loaf and the foil container together maintain the requisite rectangular characteristics during cooking, yet which may be stripped from the cooked meat loaf. An aluminum foil of gauge of approximately .0015″ is satisfactory.

Forming the cooking container 16 as a part of the process of the invention rather than employing a stamped foil pan is preferred because it results in a less expensive container which is more flexible and is not weakened by the stamping operation in critical spots such as the corners. Further, stamped metal foil pans are more difficult to strip from the cooked meat loaf and have a greater tendency to form liquid leaks.

The exemplary form 12 on which the container 16 is formed (shown in FIGURE 1) is a block of wood or other suitable material which has been constructed to approximately the same dimensions as are desired for the particular cooking container 16. The precise dimensions of the particular cooking container 16 must be determined by the amount of shrinkage actually encountered in its specific case, since variations in moisture content, ingredients, size of the loaf and cooking temperatures will affect the loaf shrinkage somewhat. However, the percentage shrinkage closely approximates the percentage fat content.

To form the foil container 16 a preferable pre-cut sheet of metal foil 14 is placed on a working surface and the form 12 placed in the approximate center of this sheet. Then the foil is folded up around the sides and ends of the form 12 to form a rectangular pan of the same dimensions as the form. Preferably the foil at the ends of the pan is folded over itself as shown in FIGURE 3.

One of the advantages of the wrapping process of forming the foil container 16 is that where it is desired to change the percentage fat content of the meat loaf mixture without changing the dimensions of the finished meat loaf, or where it is desired to change the dimensions of the meat loaf, this may be done by simply changing the dimensions of the form 12 and the packing mold 18.

Once wrapped, the foil container 16 is removed from the form 12. It is then placed inside the packing mold 18, shown in FIGURE 2. Unlike the foil container 16, the packing mold 18 is of rigid construction such as, for example, a conventional heavy metal baking pan. However, the packing mold 18 is specifically constructed so that its internal dimensions are the same as the dimensions of the foil container 16. Thus, when the foil container is inserted into the packing mold, the packing mold is in close-fitting contact with the foil container on all sides and the bottom, thereby providing rigid support to the foil container and maintaining its formed rectangular shape during the packing operation.

At this point, a weighed quantity of the meat loaf material is packed into the foil container 16. Due to the support provided by the packing mold 18 as described above, this packing operation may be accomplished with as much force as needed to relatively tightly pack the meat loaf material into the foil container without voids or air spaces. Preferably the packing operation is accomplished at the same time as the weighing operation, although it is equally possible to separate weighed quantities of the meat loaf material some time prior to the packing operation. The material is preferably packed so that the container is filled evenly from side to side with a slightly concave upper surface.

The meat loaf material is generally prepared in large quantities in advance. Of importance in the controlling of the dimensional and weight characteristics of the final loaf is the control over the percentage fat content in the uncooked mixture, as the percentage shrinkage is directly related to the percentage of fat content. The raw meat to be utilized in the mixture preferably has a fat content of 32% plus or minus 1%. An example of a preferred meat loaf mix comprises a hundred pounds of meat having the above fat content, four ounces of onion chips, three pounds of red peppers, three pounds of green peppers, ten ounces of tomato paste, and 20 pounds of water, plus seasoning. These ingredients are mixed together and then preferably three or four fat tests are run. This may employ, for example, a Hobart fat tester or other suitable measurement devices. The fat tests should be run until the measured percentages run consistently and then the mode figure taken. This provides an accurate determination of the percentage fat content by way of the complete mixture. Upon completion of the fat testing, the following table may be employed to determine the precise weight of meat loaf mixture with which each cooking container must be filled to achieve a desired final loaf weight of slightly over three pounds. Where a different final weight is desired, the amount of material to be placed in the pans may be easily computed by using the percentage shrinkage figures instead, as given here, or by simply packing into the containers a weight of material equal to the desired final weight plus a percentage of this final weight approximately equal to the measured fat percentage.

| Desired final weight (ozs.) | If fat content (percent) of meat loaf is— | Fill containers (ozs.) to— | Percent shrinkage in weight |
| --- | --- | --- | --- |
| 50 | 16–17 | 61 | 18.1 |
| 50 | 18–19 | 63 | 20.6 |
| 50 | 20–21 | 64 | 21.9 |
| 50 | 22–23 | 66 | 24.2 |

The figures below show the dimensions of the cooking container which compensates for shrinkage for the meat loaf material described above to achieve a cooked loaf having the corresponding dimensions indicated here.

Dimensions of containers (in.):  Dimensions of cooked loaf (in.)

Height, 3½ _____ 3⅛
Top width, 4³⁄₁₆ _____ 4⅛
Top length, 9¼ _____ 8¼
Bottom width, 3¹¹⁄₁₆ _____ 3⅝
Bottom length, 8½ _____ 7¾

Considering next the baking operation, it has been found that while even relatively stiff uncooked meat loaf material is not capable of maintaining itself in a rectangular shape, the combination of the shaped loaf tightly enveloped by a relatively thin foil pan is capable of sustaining molded rectangular characteristics, providing it is not subject to any major external distorting forces. Thus, the foil container containing the packed meat loaf material may be removed from the packing mold 18 as described above and will maintain its shape. The loaves may then be simply placed on a baking sheet or other convenient surface and inserted directly into an oven for baking. This enables the entire baking operation, as shown in FIGURE 4, to be done solely in the completely disposable foil containers without the use of any supporting baking pans or other containers, and yet the finished loaf accurately retains its rectangular characteristics, uniformly reduced by shrinkage. Preferably a number of loaves are baked simultaneously in an oven. The loaves may be placed on a large roasting pan and then water filled directly into the bottom of the roasting pan to about ¼ inch in height. This avoids burning of the roasting pan and facilitates cleaning of the pans should any of the meat loaf mixture leak out of the cooking containers during the baking process. Oven temperature is preferably set to 375° F., and the average cooking time is two and one-half to three hours. The cooking must be accomplished on a regular basis in which the loaves are consistently baked at approximately the same temperature (preferably to the same internal temperature of approximately 150°). This insures that the percentage shrinkage will not be affected by differences in cooking. The health regulations as to cooking requirements must, of course, be complied with.

A primary requirement for the saleability of the meat loaf, as stated previously, is that the surfaces be cooked to a dark and "crusty" consistency characteristic of a home baked meat loaf. The previous commercial methods for cooking meat loaves utilized rigid conventional baking pans, and the sides of the meat loaf generally did not have the proper "crusty" appearance. This appearance problem was further aggravated by a tendency of the surfaces of the meat loaf to stick to the sides of the rigid baking pan, so that when the meat loaf was removed from the pan, portions of the meat loaf surfaces would adhere to the baking pan, thereby leaving the meat loaf with an uneven and partially unfinished appearance, as well as wasting part of the meat loaf material.

The thin metal foil 14 allows all surfaces of the meat loaf to be exposed to a high cooking temperature corresponding to the baking environment, thus allowing the meat loaf to acquire the proper exterior "crusty" surface. Further, the flexibility of the foil container 16 is of importance in that the meat loaf material adhering to the sides of the cooking container (which was previously partially torn away from the major part of the meat loaf as the loaf shrank during the cooking process) now may draw the surfaces to which it adheres of the flexible foil container 16 inward slightly as the loaf shrinks, thus enabling the loaf to remain homogeneous.

Upon completion of the baking process the meat loaves are preferably allowed to cool before the next step, which comprises stripping off the foil material of each foil container and disposing of it. The flexible foil material can be stripped away from the cooked meat loaf far more readily than a cooked meat loaf can be removed from a rigid pan, as in the conventional practice. Further, the meat loaf having formed a uniform "crusty" surface which has not been partially torn away during the shrinkage of the loaf, the "crusty" surface thereby has greater strength to resist the stripping away of the foil once the meat loaf has cooked and cooled.

The cooked meat loaf may be frozen and stored until ready for use. Then the frozen loaf may be fitted directly into a steam table serving pan, as shown in FIGURE 4, for warming and serving.

In view of the foregoing disclosures, it is clear that there has been provided hereby improved methods for producing on a quantity basis individual meat loaves meeting specific requirements in weight and dimensions, conforming to the rectangular shape and baked exterior appearance requirements of the food purchaser, by means of convenient and low cost processes which may be carried out either by hand or by automatic machinery, utilizing a minimum of equipment.

The means and methods described herein are presently considered to be preferred. However, it is contemplated that further variations and modifications within the purview of those skilled in the arts can be made herein, and it is intended to cover in the appended claim all such variations and modifications as fall within the true spirit and scope of the invention.

What is claimed is:

1. A commercial process for preparing a cooked meat loaf of specified shape, dimensions and weight which comprises the steps of:

preparing uncooked meat loaf material having a predetermined measured percentage of fat content therein;

closely wrapping thin flexible metal foil over a substantially rectangular form so as to provide a metal foil cooking container having rectangular surfaces corresponding in dimensions to said form, said form having the specified shape of said cooked meat loaf and dimensions greater than said specified dimensions of said cooked meat loaf by an amount equal to a calculated dimensional shrinkage of said meat loaf material during cooking;

placing said metal foil container in a rigid packing mold which bears against said surfaces of said metal foil container to support the surfaces and maintain the configuration of said metal foil container during packing;

tightly packing a weight of said meat loaf material into said metal foil container without voids or air spaces in said packing mold substantially equal to said specified weight of said cooked meat loaf plus a percentage of this specified weight, said percentage being substantially equal to said predetermined measured percentage of fat content;

said meat loaf material being packed so that it is enveloped by and adheres to said metal foil container and in combination with said metal foil container forms a self-supporting dimensionally stable unit;

removing from said packing mold said unit of combined metal foil container and uncooked meat loaf material packed therein;

cooking said unit of combined metal foil container and meat loaf material as an unsupported unit whereby the metal foil container allows all surfaces of the meat loaf to be exposed to a high cooking temperature to enable said meat loaf to acquire an exterior crusty surface thereon and the metal foil surfaces being drawn slightly inwardly with the surfaces of said meat loaf material to which they adhere during the shrinkage of said meat loaf material in said cooking to prevent tearing of the meat loaf material surfaces;

and then disposably stripping said metal foil from said cooked meat loaf material.

References Cited

UNITED STATES PATENTS

| | | | |
|---|---|---|---|
| 2,179,676 | 11/1939 | Vogt | 99—174 |
| 2,937,092 | 5/1960 | Zitin | 99—108 X |
| 3,229,615 | 1/1966 | Rattner | 99—108 X |

HYMAN LORD, Primary Examiner

U.S. Cl. X.R.

99—194

PO-1050
(5/69)

UNITED STATES PATENT OFFICE
CERTIFICATE OF CORRECTION

Patent No. 3,457,085  Dated July 22, 1969

Inventor(s) Joseph Greenspan

It is certified that error appears in the above-identified patent and that said Letters Patent are hereby corrected as shown below:

Column 3, line 4, change "8 1/8" to --8 1/4-- line 26, after of insert "a"

SIGNED AND
SEALED
MAR 31 1970

(SEAL)
Attest:

Edward M. Fletcher, Jr.
Attesting Officer

WILLIAM E. SCHUYLER, JR.
Commissioner of Patents